April 9, 1946.  H. B. PETERSON ET AL  2,397,979
CLOSING MACHINE
Filed Jan. 14, 1942  5 Sheets-Sheet 5
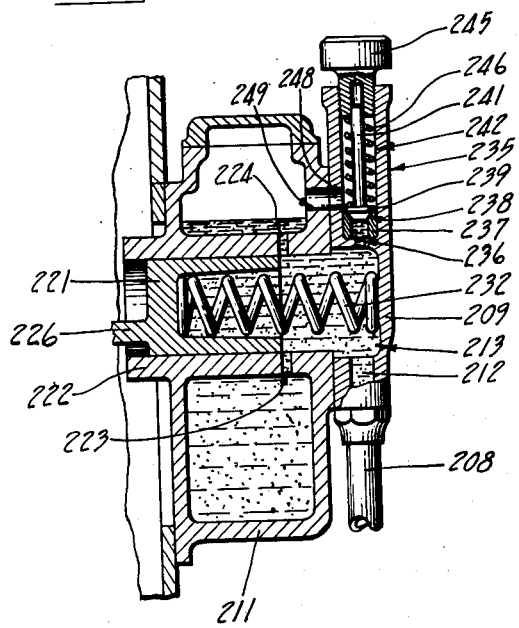
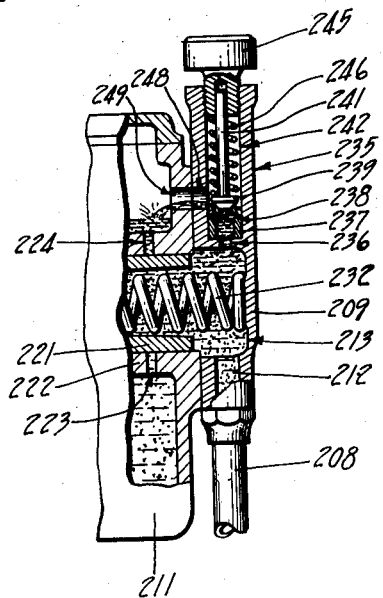
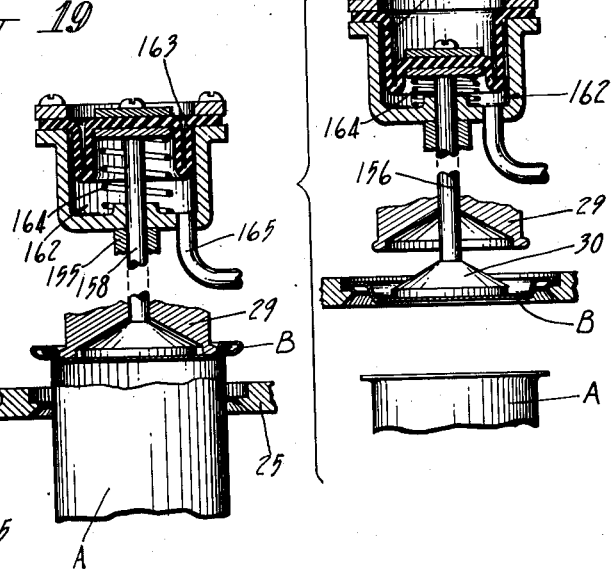
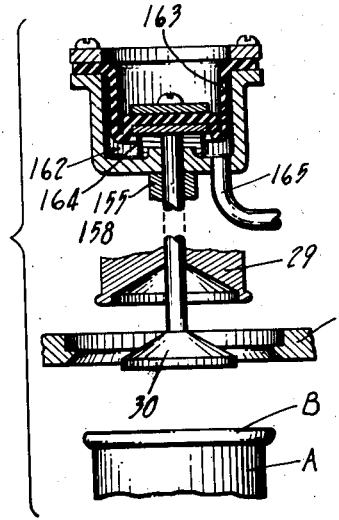
INVENTORS
Howard B. Peterson
Roland E. Renard
BY Ivan D. Thornburgh
Charles H. Gane
ATTORNEYS Patented Apr. 9, 1946

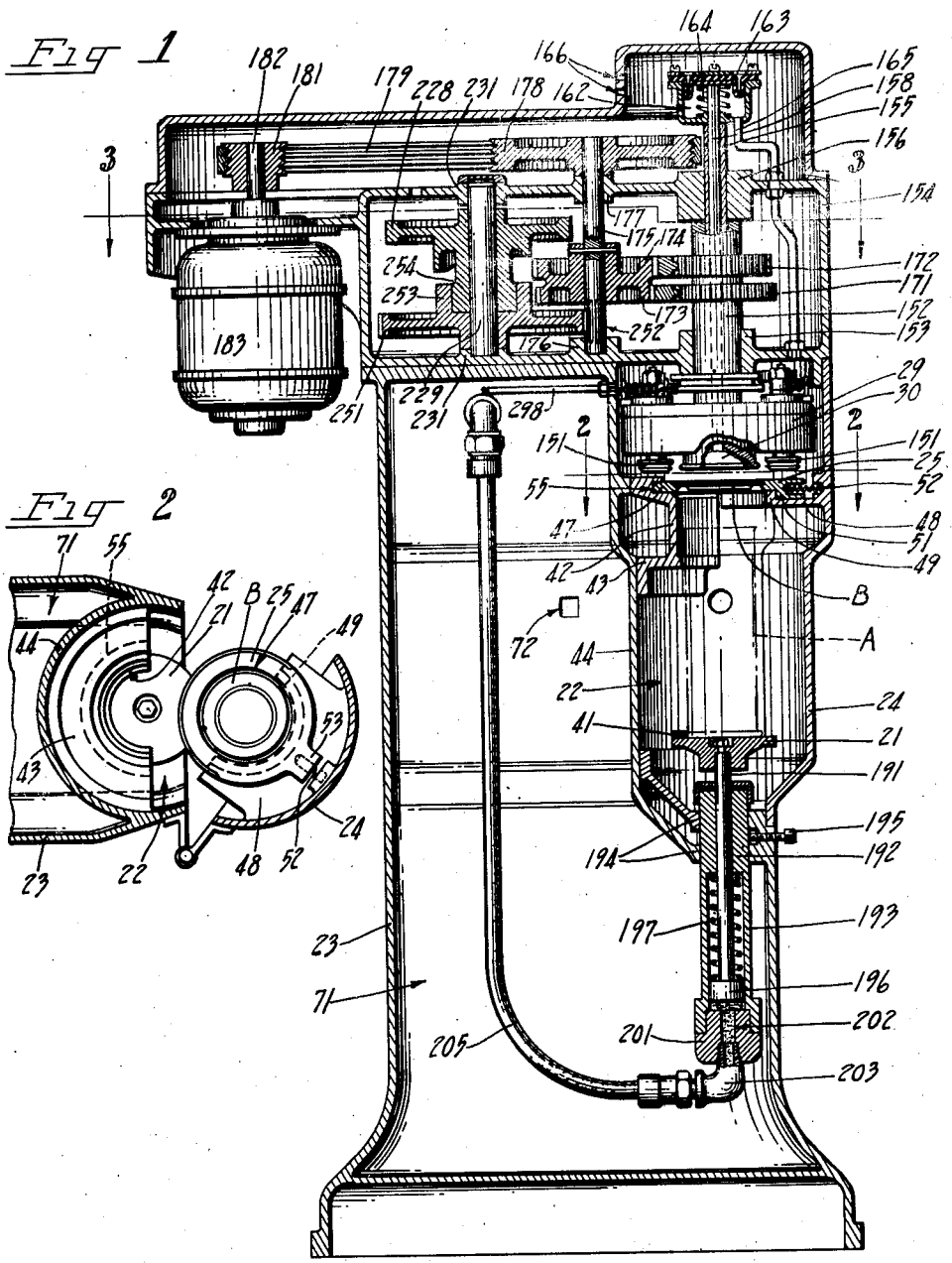

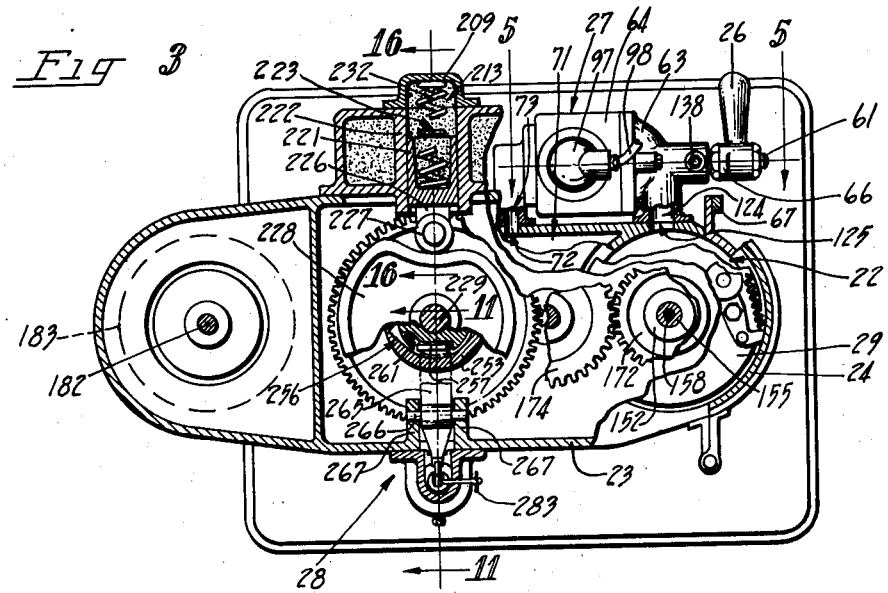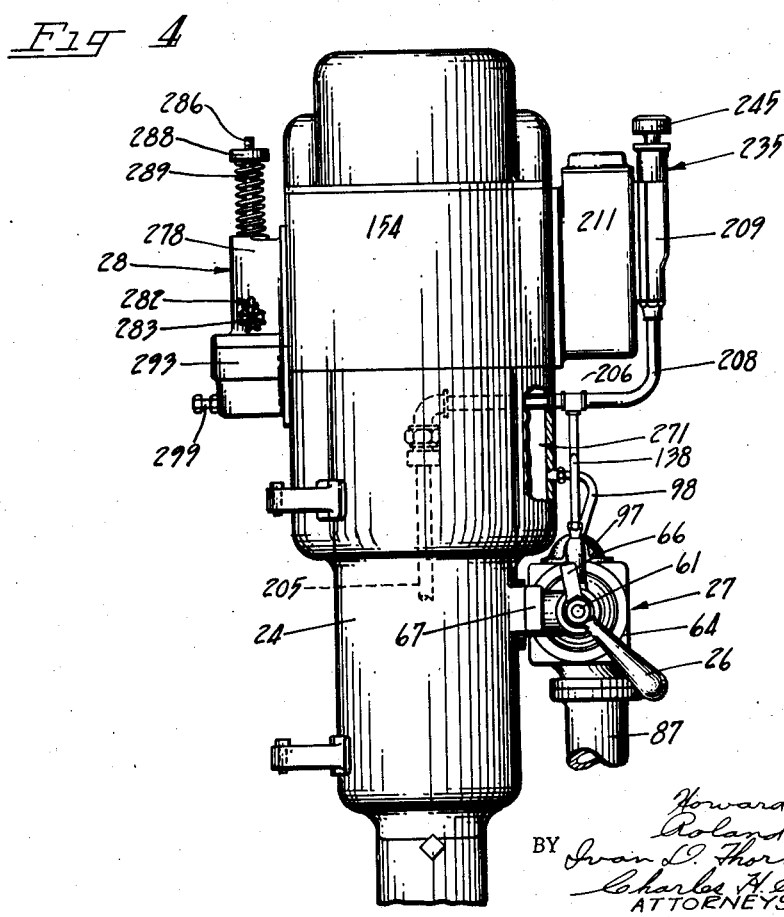

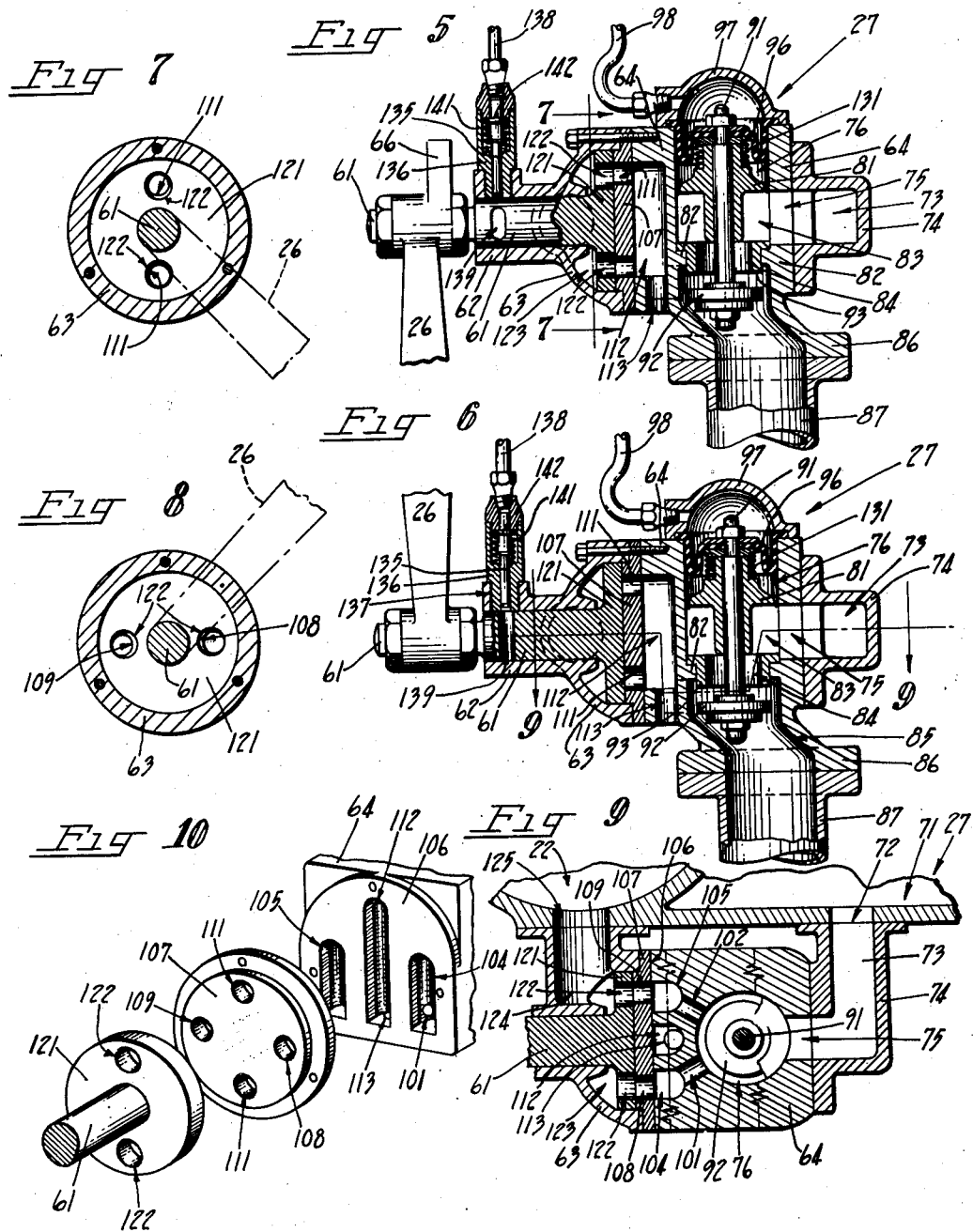

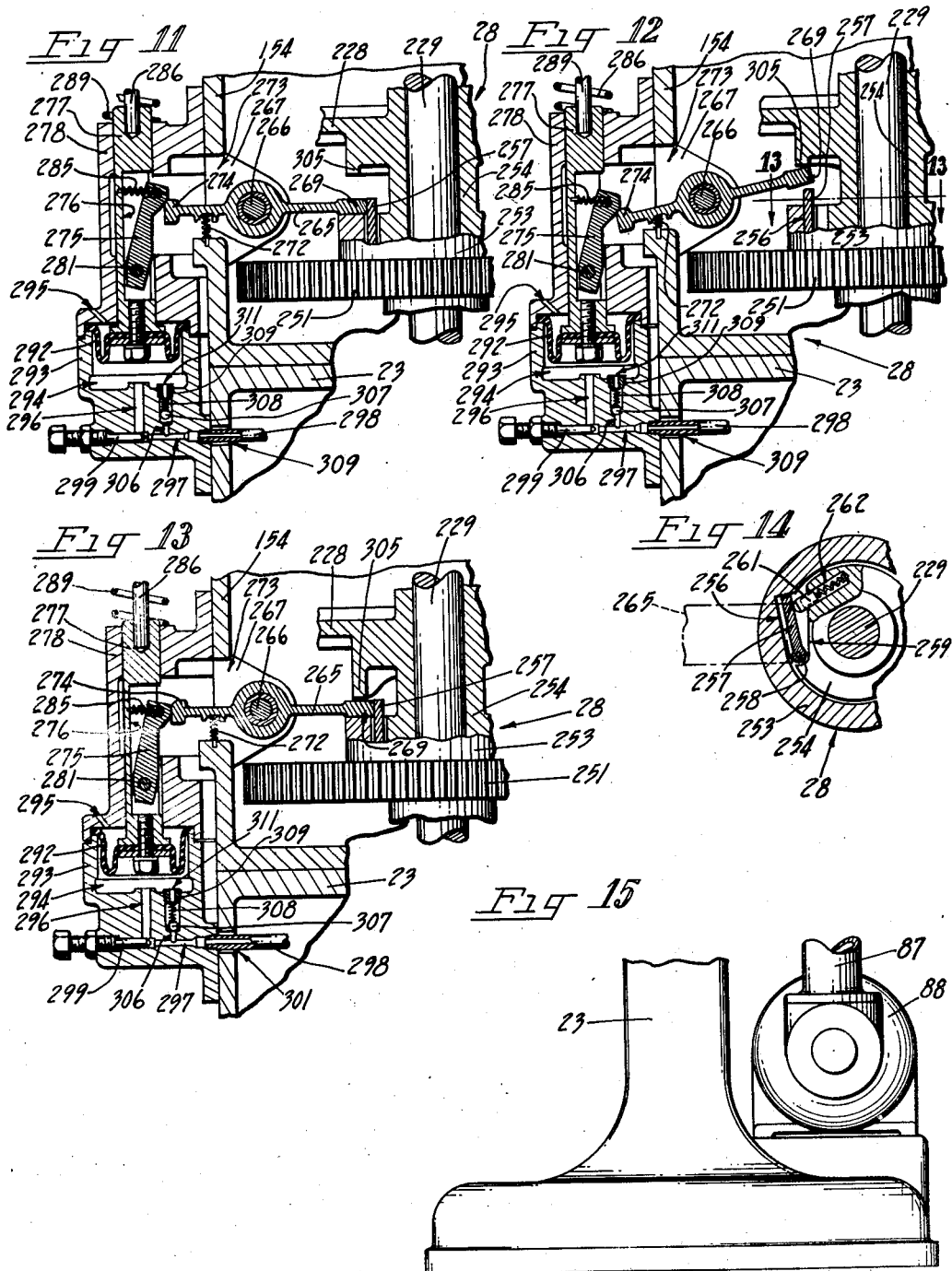

2,397,979

UNITED STATES PATENT OFFICE 2,397,979

CLOSING MACHINE

Howard B. Peterson and Roland E. Renard, San Francisco, Calif., assignors to American Can Company, New York, N. Y., a corporation of New Jersey Application January 14, 1942, Serial No. 426,760

3 Claims. (Cl. 226—82.4)

The present invention relates to a vacuum closing machine for sealing containers or cans and has particular reference to vacuum devices for controlling the operation of the machine.

Vacuum closing machines of semi-automatic character in which cans to be vacuumized and sealed are placed manually in a vacuum chamber, usually require a re-vacuumizing of the chamber after each sealing operation. In such machines a single cycle of operation serves to complete the vacuumizing and sealing of the can.

The instant invention contemplates a machine in which this cycle of operation is controlled by vacuum devices which in themselves are operated in accordance with the vacuum or air condition prevailing in the sealing chamber.

An object therefore of the invention is the provision, in a can closing machine, of vacuum devices which operate in accordance with the vacuum or air condition within the can sealing chamber and these control the cycle of operation incident to vacuumizing and sealing the can.

Another object is the provision in such a can closing machine of a knockout pad located in the sealing head which is controlled by the vacuum condition within the sealing chamber so that the can cover will be held in place on the can during the operations incident to closing the can.

Another object is the provision of such a machine wherein the vacuum condition within the sealing chamber is utilized to actuate clutch devices used to set the machine in operation for one complete can sealing cycle.

Another object is the provision in such a can closing machine of devices which are actuated by the vacuum condition within the can sealing chamber to effect, through fluid pressure means, one complete can closing cycle of the machine.

Numerous other objects and advantages of the invention will be apparent as it is better understood from the following description, which, taken in connection with the accompanying drawings, discloses a preferred embodiment thereof.

Referring to the drawings:

Figure 1 is a vertical section taken through a can closing machine embodying the instant invention;

Fig. 2 is a fragmentary horizontal section taken substantially along the line 2—2 in Fig. 1 and showing parts in a different position;

Fig. 3 is a horizontal section taken substantially along the line 3—3 in Fig. 1;

Fig. 4 is a front elevation of the upper portion of the machine, with parts broken away and parts shown in section;

Figs. 5 and 6 are enlarged sectional views of valve devices used in the machine, the views being taken substantially along the line 5—5 in Fig. 3 and showing the moving parts of the devices in different positions;

Figs. 7 and 8 are transverse sectional views taken substantially along the line 7—7 in Fig. 5 and showing the moving parts in different positions;

Fig. 9 is a sectional view taken substantially along the broken line 9—9 in Fig. 6;

Fig. 10 is an enlarged perspective exploded view of principal members of the valve device, with parts broken away;

Figs. 11, 12 and 13 are fragmentary enlarged sectional views of a clutch mechanism used in the machine, the views being taken substantially along the line 11—11 in Fig. 3 and showing the moving parts of the mechanism in different positions;

Fig. 14 is a fragmentary sectional detail taken substantially along the line 14—14 in Fig. 12;

Fig. 15 is a side elevation of the base of the machine, with parts broken away;

Figs. 16 and 17 are fragmentary enlarged sectional views of fluid pressure devices used in the machine, the view being taken substantially along the line 16—16 in Fig. 3 and showing the moving parts of the devices in different positions; and Figs. 18, 19 and 20 are fragmentary enlarged sectional views of the closing head knockout and its associated parts used in the machine and a can and cover to be united to seal the can, the views illustrating the different positions of the moving parts in relation to the can and the cover during the operations incident to closing the can.

As a preferred embodiment of the instant invention the drawings illustrate an improved vacuum closing machine of the character disclosed in United States Patent 2,113,591, issued April 12, 1938, to S. S. Jacobs, on Vacuum closing machine. In such a machine filled sheet metal cans A (Figs. 1, 18, 19 and 20) are vacuumized and are then closed with covers or ends B (Figs. 1 and 2) which are secured in place on the cans by the interfolding of flange parts to produce uniting seams of the well known double seam character.

A can A to be vacuumized and closed is placed manually upon a lifter pad 21 (Fig. 1) which is located in a sealing chamber 22 partially enclosed by walls of a frame 23 which constitute the main frame of the machine. The remainder of the sealing chamber is enclosed by a door 24 which is hingedly secured to the machine frame.

The cover B to be secured to the can is placed manually within a horizontal floating ring or support 25 (Fig. 2) which is attached to the inside of the door. Hence when the door is closed the cover is brought into vertical alignment with and above the can.

After closing the door 24 of the sealing chamber 22 the door is locked manually by a handle 26 (Fig. 4). This locking of the door actuates a vacuum valve device 27 which brings the sealing chamber into communication with a source of vacuum to vacuumize the chamber.

When the sealing chamber is sufficiently vacuumized, a one revolution clutch device 28 (Figs. 4 and 11) actuated by the vacuum within the chamber, sets the machine in operation for one complete cycle. During this cycle the lifter pad 21 is raised by fluid pressure to lift the can A and the cover B, which it picks up, into a constantly rotating seaming head 29 (Fig. 1). The pressure on the lifter pad continues during the closing or sealing operation which follows, and insures a true spinning action on the can parts while uniting them.

At the completion of the sealing operation the cycle of machine operation soon comes to an end as the clutch device operates to release the pressure on the lifter. A knockout element 30 in the seaming head, acting under the influence of the vacuum condition in the sealing chamber, pushes the can down out of the head and thus starts the lifter on its descending travel to its original position. Release of the fluid pressure on the lifter pad permits of unlocking the door on the sealing chamber. This unlocking of the door also breaks the vacuum within the chamber and thus allows the door to be opened to remove the closed can. This completes the entire cycle of operations incident to closing the can.

A detailed explanation of the machine will now be given. A can A when placed upon the lifter pad 21 is centered in a predetermined position by a stop lug 41 (Fig. 1) which is secured to the pad and by a centralizing seat 42 formed in a bracket 43 secured to an inner vertical wall 44 of the machine frame 23 (see also Fig. 2).

The cover B when placed in the floating support ring 25 rests on a shouldered countersunk seat 47 formed in the ring. The ring is loosely carried on a horizontal shelf 48 which is formed on the inside of the door 24. The shelf is provided with a semi-circular locating ledge 49 which extends up and is engaged by a similar depending shoulder 51 on the ring. The ring is yieldably pressed against the locating ledge by a compression spring 52 which is interposed between a lug 53 on the ring and the inside surface of the door. Nearly one-half of the ring overhangs the shelf 48.

The cover support ring 25 resting on the shelf 48 moves with the door and thus when the door is swung open the ring is readily accessible for the insertion of a cover B onto the ring seat 47. When the door is closed the innermost overhanging edge of the ring fits into a horizontal groove 55 in the can locating bracket 43 and this groove locates and holds the ring in vertical alignment with the can A on the lifter pad 21. The ring is maintained in this aligned position by the compression spring 52.

The handle 26 which is used to lock the door 24 in closed position is mounted on a short shaft 61 (Figs. 3, 4, 5 and 6) carried in a bearing 62 formed on a cover plate 63 secured to a valve body 64 of the vacuum valve device 27. The valve body is secured to the side of the main frame 23 adjacent the sealing chamber. The handle is formed with a locking lug 66 and this lug engages in front of a lug 67 on the door 24 to lock the door shut when the handle is rotated into locking position.

The can A and its cover B thus located and locked in the sealing chamber 22 in spaced and aligned position are ready for the vacuumizing operation. Vacuumizing of the sealing chamber is effected rapidly by use of a pre-vacuumized receiver or reservoir 71 (Figs. 1 and 2) formed in the main frame 23. The receiver is entirely enclosed by hermetic walls of the main frame. This receiver is connected by way of the valve device 27 to the sealing chamber.

One wall of the receiver 71 is formed with an outlet opening 72 (see also Figs. 3 and 9) which is in registry with a port 73 in a conduit 74. One end of the conduit is bolted to the side of the main frame 23 while the other end is secured to the valve body 64. The port 73 registers with a hole 75 in the valve body and this hole leads into a valve opening 76 in the body.

The valve opening 76 provides a clearance space for a removable but stationary valve member 81 (see also Figs. 5 and 6) which rests on an annular shoulder 82 formed inside the valve body 64. The valve member is formed with a centrally located spider section leaving spaces 83 between the spider arms which lead into a valve aperture 84 in the bottom of the member. This valve aperture communicates with a valve outlet 85 in a flanged pipe section 86 formed on the bottom of the valve body. The flanged section is bolted to a pipe 87 which connects with a continuously operating vacuum pump 88 (Fig. 15) secured to the base of the main frame 23. The pump is driven in any suitable manner.

Hence the pump 88 being directly connected with the receiver 71 draws a vacuum on the receiver and normally maintains it in a highly vacuumized condition.

The stationary member 81 in the valve body 64 carries a vertically movable valve stem 91. The lower end of the stem extends down through the aperture 84 in the bottom of the member and carries a valve head 92 which is located in the valve outlet 85. When the valve stem moves up as will be hereinafter explained the valve head engages against a valve seat 93 on the bottom of the member 81 and thus cuts off communication between the vacuum pump 88 and the receiver 71.

The upper end of the valve stem 91 is connected to a flexible vacuum cup or diaphragm 96 which covers the upper end of the valve clearance opening 76. The cup is held in place by a convex cap 97 which is bolted to the top of the valve body 64 to form a hermetic seal. The interior space between the cap and the vacuum cup is continuously in communication with the interior of the sealing chamber 22 by way of a tube 98 (Figs. 1 and 5). One end of the tube is threaded into a hole in the cap while the opposite end is threaded into a hole in a wall enclosing the sealing chamber, not shown.

Thus a pressure is maintained on the vacuum cup 96 in accordance with the vacuum condition in the sealing chamber 22. When the chamber is open to atmospheric pressure and while this pressure exists in the chamber prior to its being vacuumized, the vacuum cup is flexed into the position shown in Figs. 5 and 6 and thus the valve is maintained in an open position. This is the normal position of the valve.

Communication between the receiver 71 and the sealing chamber 22 is established by way of two channels 101, 102 (Figs. 9 and 10) which are formed in the valve body 64. These channels lead from the valve clearance space 76 into a pair of vertical grooves 104, 105 formed in a flat face 106 of the valve body. The grooves are covered with a valve plate 107 which is held in place against the face 106 of the valve body, by the cover plate 63 and by the same bolts which hold the latter. The valve plate is formed with a pair of ports 108, 109 which are in constant registry with the respective grooves 104, 105.

The valve plate 107 is also formed with a pair of ports 111 which register with a vertical groove 112 formed in the face 106 of the valve body 64. Groove 112 is an atmosphere groove and is located intermediate the two vacuumizing grooves 104, 105. The bottom end of the atmosphere groove 112 is in communication with a hole or aperture 113 in the valve body. This hole leads to the outside atmosphere.

The outer face of the valve plate 107 hermetically fits against a valve disc 121 which is formed on the door locking handle shaft 61 and which rotates with the shaft. The disc is formed with a pair of oppositely disposed holes or ports 122. The disc is located within a clearance space 123 enclosed by the cover plate 63 and this space is in communication with the sealing chamber 22 by way of a passageway 124, formed in the cover plate, and an aligning hole or aperture 125 which pierces the wall enclosing the chamber.

Thus when the door 24 is locked by turning the handle 26 (into the position shown in Fig. 8) the valve disc 121 rotates with it through ninety degrees and this brings the disc holes 122 into registry with the ports 108, 109 in the stationary valve plate 107. This is the position of the parts as shown in Figs. 6 and 9. This brings the sealing chamber 22 into direct connection with the receiver 71 by way of the valve device 27.

Atmospheric air in the sealing chamber 22 and the can A locked therein immediately flows through the chamber hole 125, passageway 124, space 123, channels 101, 102 into the valve outlet 85. This air escapes past the valve head 92 through the aperture 84 into the valve space 76, spider spaces 83 of the valve member 81, hole 75 in the valve body 64, port 73 of the conduit 74, and opening 72 in the frame. It rushes finally into the vacuumized receiver 71.

The volume of the receiver 71 is greatly in excess of that of the sealing chamber 22. Hence the air from the chamber flowing over into the receiver rapidly reduces the quantity of air in the chamber, and equalized the pressure in both compartments. As a result, a partially vacuumized condition is established in the chamber. The pressure condition thus obtaining in the chamber is communicated by way of the tube 98 to the interior of the vacuum cup cover 97 and hence reduces the pressure on the top of the flexible cup 96, thus equalizing the pressures above and below the cup.

Equalized pressure on the valve cup 96 permits a compression spring 131 (Figs. 5 and 6) interposed between the cup and the stationary valve member 81, to flex the cup upwardly and hence lift the valve stem 91. The lifting of the valve stem closes the valve head 92 against its seat 93 and thus cuts off communication between the vacuum line 87 and the receiver 71, as hereinbefore mentioned.

With the receiver 71 cut off from the vacuum line 87 and pump 88, vacuumizing of the receiver temporarily ceases and the full pull of the pump is directed against exhausting the remaining air in the sealing chamber 22 and in the can A therein. In this manner the comparatively small volume of the sealing chamber and the can are rapidly vacuumized. The vacuumized condition of the sealing chamber maintains this vacuum on the valve cup 96 and keeps the valve closed so that the chamber is directly connected with the vacuum pump during the can closing operation.

When the chamber is sufficiently vacuumized the handle 26 automatically is locked to prevent its turning so that the door cannot be opened until the machine cycle is completed. This locking of the handle is effected by a lock plunger 135 (Figs. 5 and 6) which is carried in a sleeve 136 secured in a bore 137 in the handle shaft bearing 62. The upper end of the sleeve is connected by a tube 138 to fluid pressure devices to be hereinafter described.

Fluid pressure in the tube exerts its force against the plunger 135 and forces it down into a slot 139 in the handle shaft 61 and thus locks the handle 26 against movement. At the end of a machine cycle, the pressure is relieved on the plunger whereupon a compression spring 141 surrounding the plunger, exerts its force on a head 142 of the plunger and thus lifts the latter out of the slot. This unlocks the handle so that the door may be opened to remove the sealed can.

At the completion of a machine cycle turning back of the handle 26 in a reverse direction (to the position of Figs. 5 and 7) breaks the vacuum within the sealing chamber 22 and unlocks the door 24. In this unlatched position of the handle, the valve disc ports 122 are in registry with the atmosphere ports 111 of the valve plate 107 and communication between the sealing chamber and the vacuum pump 88 is cut off.

Atmospheric air by way of the hole 113 and groove 112 in the valve body 64 rushes through the aligned ports 111 and 122 into the space 123 in the valve disc cover plate 63 and thence directly into the sealing chamber 22 by way of the passageway 124 and hole 125. It is this inrush of air that breaks the vacuum within the sealing chamber and permits of opening the door 24 to remove the can as hereinbefore mentioned.

Atmospheric air from within the sealing chamber 22 passes by way of the tube 98 into the space above the vacuum cup 96 of the valve. Hence this air now acting on the top of the cup with the vacuum pump 88 still drawing a vacuum from below the valve 92 in the pipe line space 85, compresses the valve spring 131 and this opens the valve. The receiver 71 is in this way brought into communication with the vacuum pump and the latter exhausts the air therein and returns the receiver to a vacuumized condition in preparation for the next cycle of the machine. This vacuumizing of the receiver is performed while the can, after sealing, is being removed from the sealing chamber 22 and while a new can and cover are being inserted for the next cycle of the machine. Thus considerable time and energy are saved in the vacuumizing operations of this machine.

While the can A is in the chamber 22 and while the latter is in a vacuumized condition, the can is raised up to meet the superimposed cover B and then both can and cover are further lifted into the sealing head 29 for the sealing operation hereinbefore mentioned. The sealing is effected preferably by seaming rollers 151 (Fig. 1) which are carried on the head in the manner usual in such can sealing heads.

The sealing head 29 may be a conventional can closing head such as described in the above mentioned Jacobs Patent 2,113,591, and is carried on a hollow vertical shaft 152 journaled in a bearing 153 in a casing 154 mounted on top of the machine frame 23. The shaft rotates on a sleeve 155 which is carried in a bearing 156 spaced above the shaft bearing 153. The sleeve guides a knockout stem 158 which extends down through the sealing head and carries on its lower end the knockout pad or element 30 hereinbefore mentioned.

The upper end of the knockout stem 158 extends up into a hollow casing 161 enclosing a compartment 162 covered on its top by a flexible vacuum cup 163. The cup is secured to the top end of the knockout stem and is backed up by a compression spring 164 surrounding the stem inside the casing. Compartment 162 is constantly in communication with the sealing chamber 22 by way of a tube 165 which connects these parts. The outer surface of the vacuum cup 163 is subjected at all times to outside atmospheric pressure which enters the casing 154 through holes or apertures 166 in a wall of the casing.

Thus when an atmospheric pressure condition exists within the sealing chamber 22, air enters the compartment 162 of the knockout device and thus balances the pressure on the vacuum cup 163. This permits the compression spring 164 to force the cup and the knockout stem upwardly and thus hold the knockout pad 30 in its normal position within the sealing head 29, as shown in Fig. 1.

When the sealing chamber 22 has become vacuumized as hereinbefore explained, the air is exhausted from the knockout compartment 162 by way of the tube 165 and this unbalances the pressure on the vacuum cup 163. Atmospheric pressure acting on the outer surface of the cup at such a time compresses the spring 164 and thus lowers the knockout stem 158. This brings the knockout pad 30 down into engagement with the can cover B in the ring 25 (Fig. 18) and thus holds the cover under pressure until the rising can A picks it up.

During the upward travel of the can and the cover, the can through the cover lifts the knockout pad, against the atmospheric pressure on the vacuum cup 163. This action takes place while the pressure on the can cover is maintained and this keeps it seated on the can. When the can and cover enter the sealing head 29 and as long as they remain in the head, the vacuum within the compartment 162 holds the knockout pad tight against the can cover, as shown in Fig. 19.

At the completion of a can sealing operation as the sealed can moves down into its original position, the atmospheric pressure acting on the outer surface of the vacuum cup 163 still holds the knockout pad 30 in contact with the can cover. This pushes the sealed can down until it is below and clear of the cover support ring 25. Fig. 20 shows the can further lowered from the pad.

When the vacuum is broken within the sealing chamber 22, such a condition is relayed to the compartment 162 by way of the tube 165. The spring 164 thereupon lifts the knockout pad 30 into its normal position within the head 29. In this normal position, it is clear of the cover support ring 25 and will not interfere with the opening of the door 24.

The sealing head 29 is rotated continuously through a differential drive as by a pair of spur gears 171, 172 (Fig. 1) which are mounted on the head shaft 152 and on a rotatable sleeve within the shaft. This is a usual sealing head drive. These gears mesh with and are driven by a pair of driving gears 173, 174 which are mounted on a vertical drive shaft 175 journaled in bearings 176, 177 formed in the casing 154. The upper end of the drive shaft carries a grooved pulley 178 which is rotated through a belt 179. The belt takes over and is driven by a pulley 181 which is mounted on a rotor shaft 182 of an electric motor 183 bolted to the casing 154. The motor is the main driving unit of the machine and may be operated from a suitable source of electric energy.

It has been stated that raising of the can A and its cover B into the rotating sealing head 29 for the closing operation is by ascent of the lifter pad 21. This lifter pad is secured to the upper end of a vertical plunger rod 191 (Fig. 1) carried in a long bearing 192 of a cylinder 193.

In the machine shown in the drawings the effective stroke of the lifter pad 21 in its mounting is approximately three inches but the range of cans which may be closed is from one to fifteen inches. To provide for such a wide variation, the cylinder 193 is carried in a pair of spaced bearings 194. The cylinder may be adjusted vertically to bring the pad into an approximate position for the height of the cans being closed and to bring it within the lifter pad movement. After such an adjustment, the cylinder is locked in position as by a locking screw 195 which is threaded into the machine frame 23. The inner end of the screw bears against the cylinder.

Within the cylinder 193, the lower end of the plunger rod 191 is formed with a plunger head 196 which constitutes a piston. The plunger head is backed up by a compression spring 197 disposed around the rod and interposed between the plunger head and the rod bearing 192. The spring presses down on the plunger head and normally maintains the lifter pad 21 in its lowermost position.

The lifter pad 21 is raised under pressure of a fluid medium, preferably oil, which acts against the bottom surface of the plunger head 196. For this purpose the lower end of the cylinder is fitted with a cap 201 having a port 202 which leads from a pipe connection 203 threaded into the cap. The pipe connection holds one end of a flexible tube 205 which extends up through the vacuumizing receiver 71.

The upper end of the tube extends through a wall of the frame 23 which encloses the receiver. This end of the tube is connected into a T 206 (Fig. 4) which connects with the pipe 138 leading to the handle locking plunger 135 and with a pipe 208 which connects with a valve plate 209 (see Figs. 16 and 17) of an oil reservoir 211 secured to a side of the main frame 23. The pipe 208 leads from an outlet 212 in the plate and this outlet is in communication with a recess 213 in the plate.

The plate recess 213 constitutes a part of a liquid pump which is built into the reservoir 211. The pump comprises a piston 221 which slides in a cylinder 222 formed in the reservoir. The level of the oil in the reservoir is maintained in a position above the pump level and ports 223, 224 in the walls of the submerged cylinder permit the oil to flow into the pump cylinder and keep it filled at all times.

During each cycle of operation of the machine the pump piston 221 is moved in its cylinder 222 through a forward or working stroke and thence through a return stroke. For this purpose the inner end of the piston is formed with a lug 226 (Figs. 3 and 16) which carries a cam roller 227. The cam roller operates against an edge cam 228 (see also Fig. 1) which is mounted on a vertical cam and clutch shaft 229 carried in bearings 231 formed in the casing 154. The cam roller is held under pressure against the cam by a compression spring 232 disposed between the piston 221 and the valve plate 209 adjacent the recess 213.

During a cycle of operation of the machine the cam 228 makes one complete revolution. During the first part of this revolution the cam moves the piston 221 through its forward or outward stroke. As soon as the piston begins to move, it covers the ports 223, 224 in the cylinder walls and thereby traps within the cylinder the oil which flowed into it through the ports. As the piston continues to move forward this trapped oil is forced through the outlet 212 in the valve plate 209 and thence into and through the pipe 208, and tube 205 to the lifter cylinder 193. The force of the oil acting against the plunger head 196 in the lifter cylinder raises the plunger 191 and the lifter pad 21 with its can A and thus lifts the can into the sealing head 29, as hereinbefore explained.

During the can sealing operation the can is held clamped against the sealing head by a steady pressure which is maintained on the lifter mechanism. This pressure is brought about by the can coming to a stop by engagement with the head under the pressure of the pump piston 221 continuing its forward movement against the oil in the cylinder 222 and forcing this oil through a by-pass valve 235 (Figs. 16 and 17) in the valve plate 209.

The by-pass valve includes an outlet port 236 formed in the valve plate and having communication with the pump recess 213. The outlet port 236 leads into a stationary hollow valve member 237 having a concave seat 238 which normally receives a conical valve head 239 formed on a vertical stem 241. The valve member and the valve head and its stem are disposed in a bore 242 in the valve plate.

The upper end of the valve stem 241 slides in a bearing formed in an adjusting screw 245 threaded in the walls of the plate surrounding the bore 242. A compression spring 246 located around the valve stem and interposed between the screw 245 and the valve head 239 holds the latter in its normal closed position against the valve seat 238.

When the rising can A on the lifter pad 21 engages against the sealing head 29, the oil in the pump cylinder 222 under pressure of the moving piston 221 forces against the by-pass valve head 239 and partially opens the valve against the resistance of the spring 246, as shown in Fig. 17. A part of the oil flows up through the partially open valve and empties into the reservoir 211 by way of a pair of aligned ports 248, 249 formed respectively in the valve plate 209 and in the adjacent wall of the reservoir. By turning the screw 245 the pressure on the spring 246 may be adjusted so that a greater or lesser force exerted by the oil will be required to open the valve sufficiently to permit of the by-passing of the oil or other non-compressible fluid.

In this manner the maintained pressure on the lifter pad 21 and the can A thereon may be regulated to any pressure required to effect a proper sealing or uniting of the can and its cover. This pressure is maintained for the greater part of the machine cycle. It is this pressure that also locks the door handle 26, as hereinbefore mentioned.

During the latter portion of the operating cycle, the cam 228 permits the pump spring 232 to move the piston 221 through its return stroke in the cylinder 222. This return movement of the piston relieves the pressure on the oil or other fluid medium and thus reduces the pressure on the lifter pad 21. When the piston has returned to its original or normal position, the pressure on the lifter pad has been fully dissipated and the pad therefore has moved down under the pressure of the spring 197 to its original lowered position.

When the piston is in this returned position it no longer covers the ports 223, 224 in the cylinder walls and this permits the oil medium from the reservoir to enter the cylinder and replace the oil that was by-passed through the valve 235 during the can closing operation.

Rotation of the pump operating cam 228 at the proper time is effected by the one revolution clutch device 28 (Figs. 13 and 14) hereinbefore mentioned. This clutch device includes a constantly rotating gear 251 (Fig. 1) which is mounted loosely on the vertical cam and clutch shaft 229. The gear meshes with and is rotated by pinion teeth 252 formed in the differential gear shaft 175. The gear is formed with a clutch hub 253 which revolves around a cam hub 254 on the cam 228 (see also Figs. 11, 12, 13 and 14).

The clutch hub 253 is formed with a single notch 256 (Fig. 14) which periodically is engageable by a pawl or flapper 257 mounted on a pivot pin 258 in the cam hub 254. The flapper is located in a recess 259 in the cam hub and is backed-up by a spring barrel 261 disposed in a socket 262 in the cam hub.

The flapper 257 is held normally out of engagement with the notch 256 in the clutch hub 253 and against the resistance of the spring barrel 261 by a horizontal lever 265 (Fig. 11) which is disposed in the casing 154. Thus the gear 251 is permitted to rotate while the cam hub 254 and its connected parts normally remain stationary. The lever 265 is mounted on a pivot pin 266 carried in a pair of spaced lugs 267 which extend inwardly from the casing 154 (see also Fig. 3).

The inner end of the clutch lever 265 is formed with an enlarged end 269 which normally engages the pawl or flapper 257. The lever is maintained normally in a horizontal position by a compression spring 272 which is located adjacent the outer end of the lever and which is interposed between the lever and a wall of the casing 154. This end of the lever extends through an opening 273 in the casing wall and is formed with a cam surface 274 which engages a trip finger 275. The contacting face of the trip finger is contoured to afford the best cooperation with the cam surface 274 of the clutch lever.

The trip finger 275 is located in a recess 276 formed in a vertical slide member 277 carried in a slide housing 278 which is bolted to the casing 154. The finger is mounted on and is secured to a pivot pin 281 carried in the slide. One end of the pin extends through a slot 282 (Fig.

4) in the housing and carries a knob 283 by means of which the pivot pin may be pulled down. This provides for manual manipulation of the trip finger when desired. The upper end of the finger is maintained in contact with the horizontal lever 265 by a compression spring 285 (Fig. 11) which is interposed between the back of the finger and the recessed wall of the slide 277.

The upper end of the slide 277 extends above the top of the housing 278 and carries a vertical rod 286, the upper end of which is threaded for an adjusting nut 288 (Fig. 4). Between the nut and the housing, a compression spring 289 surrounds the rod. This spring supports the slide and the nut provides for adjusting the pressure of the spring as will be hereinafter explained.

The lower end of the slide 277 extends down below the bottom of the slide housing 278 and carries a flexible vacuum cup or diaphragm 292. The outer edge of this cup is held tightly in place against the bottom of the housing by a cup housing 293 which is bolted to the slide housing. The cup housing is also bolted to the main frame 23. The cup 292 extends down into a chamber 294 in the cup housing 293. The upper side of the cup is open to atmospheric pressure by way of a vent aperture 295 in the slide housing 278.

The lower side of the cup 292 is subject to the air condition that obtains in the sealing chamber 22. For this latter purpose the cup housing 293 is formed with a vertical passageway 296 which leads from the cup chamber 294. This passageway extends into a horizontal passageway 297 which is in communication with a pipe 298. At the junction of these two passageways there is an adjustable needle valve 299 by means of which the rate of flow of air from one passageway to the other is regulated.

One end of the pipe 298 may be threaded into the cup housing and projects through an opening 301 in the adjacent frame wall of the receiver 71. Pipe 298 extends to any convenient position in the inner wall of the sealing chamber where it is threaded into the chamber wall. This is not shown but it will be understood that this end of the pipe is in communication with the interior of the sealing chamber 22.

Hence when the sealing chamber 22 is vacuumized the cup chamber 294 also becomes vacuumized. Thus when the sealing chamber is sufficiently vacuumized to begin the sealing operation on the can A located therein, the vacuum condition in the cup chamber permits the atmospheric air above the cup 292 to push the cup down into the chamber into the position of Fig. 12. This movement of the cup draws the slide 277 down against the resistance of the slide supporting spring 289. The descending slide draws the trip finger 275 down with it and said finger bears down on the outer end of the lever 265 and tilts it into the position shown in Fig. 12.

Tilting of the trip lever 265 raises its inner end above the clutch flapper 257 and thus releases the flapper. The spring barrel behind the flapper pushes the latter outwardly against the inside surface of the clutch hub 253 and when the notch 256 in the continuously rotating clutch hub advances adjacent the flapper the latter engages the notch and thus connects the clutch hub with the cam hub 254. Thereupon these hubs revolve as one unit. It is this clutching action that rotates the pump cam 228 at the proper time to raise the lifter pad and its can A into position for the can sealing operation.

At the end of a single revolution of the pump cam 228 which constitutes the cycle of operation of the machine, the clutch flapper 257 is withdrawn from the notch 256 in the clutch hub 253 and this disconnects the cam from the gear 251. The cam thus stops rotating. Withdrawal of the flapper from the clutch hub notch is effected by a ring cam 305 (Figs. 12 and 13) which is formed on the cam hub 254.

The ring cam 305 is shaped to press down on the inner end of the clutch lever 265 at the end of the cycle moving the lever into the position shown in Fig. 13. The lever then is in the path of travel of the flapper. The flapper while rotating with the clutch hub upon engaging the end of the clutch lever, is forced out of the clutch notch 256. The lever remains in this horizontal position and thus holds the flapper out of the clutch notch.

When the vacuum in the sealing chamber 22 is broken to open the door 24 so that the sealed can may be removed, the entering air also rushes into the cup chamber 294 of the cup housing 293 and thus breaks the vacuum within this chamber. This permits the slide support spring 289 to lift the slide 277 and its trip finger 275 into its normal position as shown in Fig. 11 where it is ready for a subsequent clutching operation when the next can to be closed is placed in the sealing chamber.

In order to effect the raising of the slide 277 as speedily as possible a relief valve is provided in the cup housing 293. The relief valve includes a channel 306 which connects the passageway 297 with the cup chamber. This channel is closed normally by a ball 307 which is backed up by a compression spring 308 interposed between the ball and a nut 309 threaded into the cup housing. The nut is formed with a central aperture 311.

Atmospheric air flowing from the sealing chamber 22 into the cup chamber 294 by way of the passageways 296, 297 and needle valve 299 lifts the ball 307 of the relief valve and thereby opens a larger entrance way into the cup chamber than that afforded by the needle valve alone. The vacuum in the cup chamber thereupon is quickly dissipated and this permits the rapid return of the slide 277 to its original raised position.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. In a machine for sealing containers under vacuum, the combination of a sealing chamber having means for vacuumizing the same, a continuously rotatable sealing head disposed within said chamber and having means for rotating the same, a lifter pad disposed in vertical alignment with said head for supporting a container having a loosely applied cover thereon within said chamber to be sealed, fluid pressure means for elevating said lifter pad and its supported container into said head for sealing the cover on the container, a vertically disposed clutch shaft rotatable by said sealing head rotating means, a clutch disposed on said shaft, pressure responsive means for rendering said vacuumizing means effective to vacuumize said chamber with its enclosed container prior to sealing the latter, said pressure responsive means being further operable to render said vacuumizing means ineffective to vacuumize said chamber after a predetermined degree of vacuum has been obtained, and a second pressure responsive means rendered operative by pressure conditions existing in said vacuumized chamber for energizing said clutch to actuate said lifter pad elevating means to engage the vacuumized container with said sealing head to seal the cover on the container.

2. In a machine for sealing containers under vacuum, the combination of a sealing chamber having means for vacuumizing the same, a continuously rotatable sealing head disposed within said chamber and having means for rotating the same, a lifter pad disposed in vertical alignment with said head for supporting a container having a loosely applied cover thereon within said chamber to be sealed, fluid pressure means for elevating said lifter pad and its supported container into said head for sealing the cover on the container, a vertically disposed clutch shaft rotatable by said sealing head rotating means, a normally inoperative clutch disposed on said shaft, pressure responsive means for connecting said vacuumizing means with said chamber to vacuumize the latter and its enclosed container prior to sealing the container, said pressure responsive means being operable to render said vacuumizing means ineffective to vacuumize said chamber after a predetermined degree of vacuum has been obtained, and a second pressure responsive means including a flexible diaphragm having valve controlled connection with said sealing chamber for engaging and disengaging said clutch with said head rotating means, whereby predetermined pressure conditions in the chamber obtained by said vacuumizing means are communicated to said second pressure responsive means to effect engagement of said clutch with said head rotating means to actuate said lifter pad elevating means and engage the vacuumized container with said head to seal the container.

3. In a machine for sealing containers under vacuum, the combination of a sealing chamber having means for vacuumizing the same, a continuously rotatable sealing head disposed within said chamber and having means for rotating the same, a lifter pad disposed in vertical alignment with said head for supporting a container having a loosely applied cover thereon within said chamber to be sealed, fluid pressure means for elevating said lifter pad and its supported container into said head for sealing the cover on the container, a vertically disposed clutch shaft rotatable by said sealing head rotating means, a normally inoperative clutch disposed on said shaft, pressure responsive means effective in one position to connect said vacuumizing means with said chamber to vacuumize the latter and its enclosed container prior to sealing the container, said pressure responsive means in another position closing off communication between said vacuumizing means and said chamber after a predetermined degree of vacuum has been obtained, a movable lever for engaging and disengaging said clutch with said head rotating means, a trip finger engageable with said lever, movable means for supporting said finger, and pressure responsive means including a movable diaphragm connecting said finger supporting means with said sealing chamber, whereby a predetermined pressure condition in said chamber as determined by said vacuumizing means is communicated to said finger supporting means so as to render said movable lever effective to connect said clutch with said head rotating means, said clutch when thus connected actuating said lifter pad elevating means to engage the vacuumized container with said head to seal the container.

HOWARD B. PETERSON.
ROLAND E. RENARD.